(12) United States Patent
Hosoda et al.

(10) Patent No.: US 7,711,210 B2
(45) Date of Patent: May 4, 2010

(54) SELECTION OF IMAGES FOR IMAGE PROCESSING

(75) Inventors: Tatsuya Hosoda, Nagano-ken (JP); Naoki Kuwata, Nagano-ken (JP); Junichiro Shinozaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1007 days.

(21) Appl. No.: 11/084,390

(22) Filed: Mar. 17, 2005

(65) Prior Publication Data

US 2005/0234719 A1 Oct. 20, 2005

(30) Foreign Application Priority Data

Mar. 26, 2004 (JP) ............................. 2004-090752

(51) Int. Cl.
*G06K 9/54* (2006.01)
(52) U.S. Cl. .................................... 382/305
(58) Field of Classification Search ................ 382/164, 382/305, 224–228
See application file for complete search history.

(56) References Cited

U.S. PATENT DOCUMENTS

| | | | | |
|---|---|---|---|---|
| 5,872,865 | A * | 2/1999 | Normile et al. | 382/224 |
| 5,913,205 | A * | 6/1999 | Jain et al. | 707/2 |
| 5,974,218 | A * | 10/1999 | Nagasaka et al. | 386/46 |
| 6,014,664 | A * | 1/2000 | Fagin et al. | 707/5 |
| 6,240,423 | B1 * | 5/2001 | Hirata | 707/104.1 |
| 6,269,368 | B1 * | 7/2001 | Diamond | 707/6 |
| 6,445,834 | B1 * | 9/2002 | Rising, III | 382/305 |
| 6,535,639 | B1 * | 3/2003 | Uchihachi et al. | 382/225 |
| 6,549,643 | B1 * | 4/2003 | Toklu et al. | 382/107 |
| 6,807,303 | B1 * | 10/2004 | Kim et al. | 382/203 |
| 6,970,860 | B1 * | 11/2005 | Liu et al. | 707/3 |
| 7,035,435 | B2 * | 4/2006 | Li et al. | 382/107 |
| 7,206,779 | B2 * | 4/2007 | Furuhashi et al. | 707/5 |
| 2002/0178135 | A1 * | 11/2002 | Tanaka | 707/1 |
| 2004/0085483 | A1 * | 5/2004 | Li et al. | 348/700 |
| 2004/0088291 | A1 * | 5/2004 | Matsuzaki et al. | 707/3 |

FOREIGN PATENT DOCUMENTS

| | | | |
|---|---|---|---|
| JP | 2001-119649 | | 4/2001 |
| JP | 2001119649 | * | 4/2001 |
| JP | 2002-142189 | | 5/2002 |

OTHER PUBLICATIONS

Abstract of Japanese Patent Publication No. 2001-119649, Pub. Date: Apr. 27, 2001, Patent Abstracts of Japan.
Abstract of Japanese Patent Publication No. 2002-142189, Pub. Date: May 17, 2002, Patent Abstracts of Japan.

* cited by examiner

*Primary Examiner*—Samir A. Ahmed
*Assistant Examiner*—Jayesh Patel
(74) *Attorney, Agent, or Firm*—Martine Penilla Gencarella, LLP

(57) ABSTRACT

Scores are calculated for each of a plurality of preselected evaluation items for each image, and the plurality of scores are weighted and combined to produce combined scores. Then a plurality of candidate images are selected and displayed from a group of images based on these combined scores. A user selects one or more images to be processed from these candidate images, and the degrees of correlation between user selected images and evaluation items are found based on the scores for a plurality of evaluation items in the images selected for processing. Then the weightings of evaluation items having high degrees of correlation are increased.

9 Claims, 11 Drawing Sheets

Fig.4

Examples of Evaluation Items and Weighting Coefficients

| Evaluation Items | | Weighting Coefficients | | |
|---|---|---|---|---|
| Type | Specifics | Reference Character | Initial Value | Current Value |
| body motion | body position | k1 | 1.0 | 1.0 |
| | body size | k2 | 1.0 | 1.0 |
| | size of body movement | k3 | 1.0 | 0.8 |
| | amount of body edge | k4 | 1.0 | 0.2 |
| | stasis | k5 | 1.0 | 0.1 |
| camerawork | zoom in | k6 | 1.0 | 0.5 |
| | zoom out | k7 | 1.0 | 0.5 |
| | pan | k8 | 1.0 | 0.2 |
| | tilt | k9 | 1.0 | 0.2 |
| composition | position of photographic subject | k10 | 1.0 | 0.9 |
| | orientation | k11 | 1.0 | 0.5 |
| color/ brightness variance | contrast | k12 | 1.0 | 0.8 |
| | color variance | k13 | 1.0 | 0.8 |
| | edge strength | k14 | 1.0 | 0.8 |
| | brightness variance | k15 | 1.0 | 0.8 |
| | background/foreground difference | k16 | 1.0 | 0.8 |
| other | skin tone coverage | k17 | 1.0 | 1.0 |
| | expression | k18 | 1.0 | 0.5 |

Fig.5

Evaluation Items and Weighting Coefficients Used in Embodiment

| Evaluation Items | | Weighting Coefficients | | |
|---|---|---|---|---|
| Reference Character | Meaning | Reference Character | Before Adjustment | After Adjustment |
| EF1 | color variance | k1 | 1.00 | 0.10 |
| EF2 | edge strength | k2 | 1.00 | 1.00 |
| EF3 | brightness variance | k3 | 1.00 | 0.10 |

Fig.6A Frame Score for Color Variance EF1
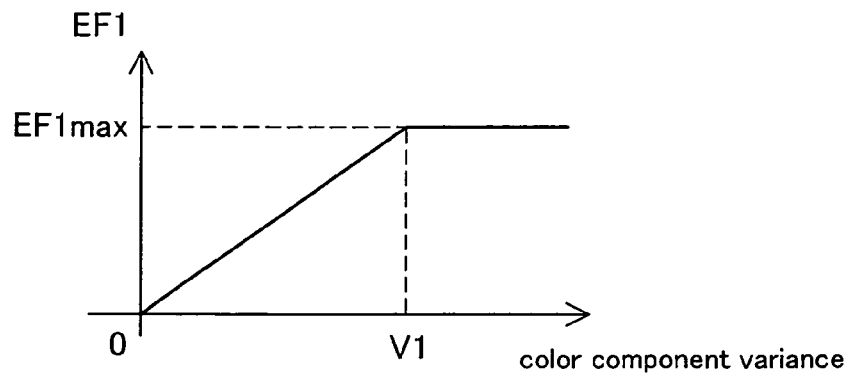
Fig.6B Another Example of Frame Score for Color Variance EF1
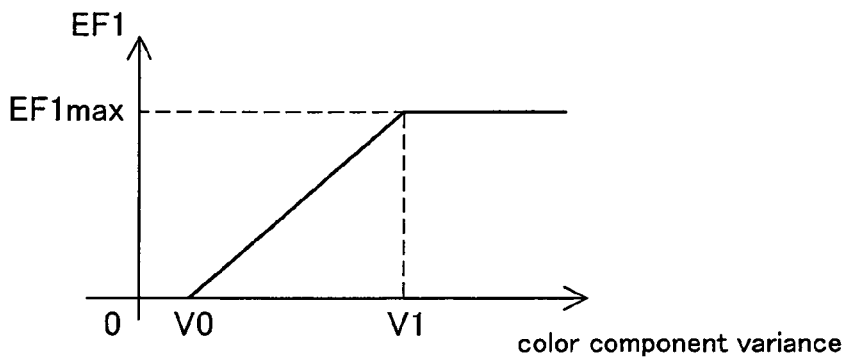
Fig.6C Frame Score for Edge Strength EF2
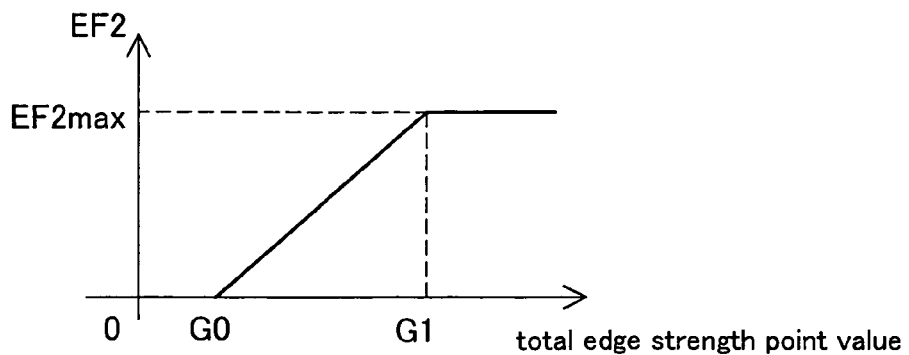

|  | split scene 1 | split scene 2 | split scene 3 | split scene 4 | split scene 5 |
|---|---|---|---|---|---|
| combined split scene score ES | 18 | 13.33 | 2 | 13 | 14.5 |

Entire Video

Digest

|  | split scene 1 | split scene 2 | split scene 3 | split scene 4 | split scene 5 |
|---|---|---|---|---|---|
| combined split scene score ES | 2.69 | 4.97 | 0.20 | 8.56 | 7.77 |

SELECTION OF IMAGES FOR IMAGE PROCESSING

CROSS REFERENCE TO RELATED APPLICATIONS

The present application claims the priority based on Japanese Patent Application No. 2004-90752 filed on Mar. 26, 2004, the disclosure of which is hereby incorporated by reference in its entirety.

BACKGROUND OF THE INVENTION

1. Field of the Invention

This invention relates to technology for selecting video and static images for image processing.

2. Description of the Related Art

Known image processing technology includes that disclosed in JP2001-119649A. In this conventional technology, numerical data is extracted from the footage in question, and the importance of each scene is determined based on this numerical data. A summary is then created from those sections having an importance that is greater than a threshold value.

However, in conventional methods, it was not necessarily possible to suitably reflect user preferences, which were expressed by image selection operations, in subsequent image selection. This problem is not limited to video processing, but it is a common problem when selecting suitable images for processing from any group comprising a plurality of images.

SUMMARY OF THE INVENTION

An object of the present invention is to provide technology capable of suitably reflecting user preferences, which are expressed by image selection operations, in subsequent image selection.

According to an aspect of the present invention,

By virtue of this image processing device, the weighting for an evaluation item having a high degree of correlation with a user selection is increased, whereby user preferences can be suitably reflected when subsequent selection is performed.

It should be noted that the present invention can be carried out in various different modes. For example, it may be carried out as an image processing method and device, as a video editing method and device, as a computer program for implementing the functions of these methods and devices, and as a storage medium storing this computer program.

These and other objects, features, aspects, and advantages of the present invention will become more apparent from the following detailed description of the preferred embodiments with the accompanying drawings.

BRIEF DESCRIPTION OF THE DRAWINGS

FIG. 4 is a schematic diagram illustrating an example of evaluation items for which scores are calculated.

FIG. 5 is a schematic diagram illustrating another example of evaluation items for which scores are calculated.

FIGS. 6A through 6C are graphs illustrating score calculation methods.

DESCRIPTION OF THE PREFERRED EMBODIMENT

Embodiments of the present invention are described in the following order:

A. Embodiment

B. Variants

A. Embodiment

Figure 1:
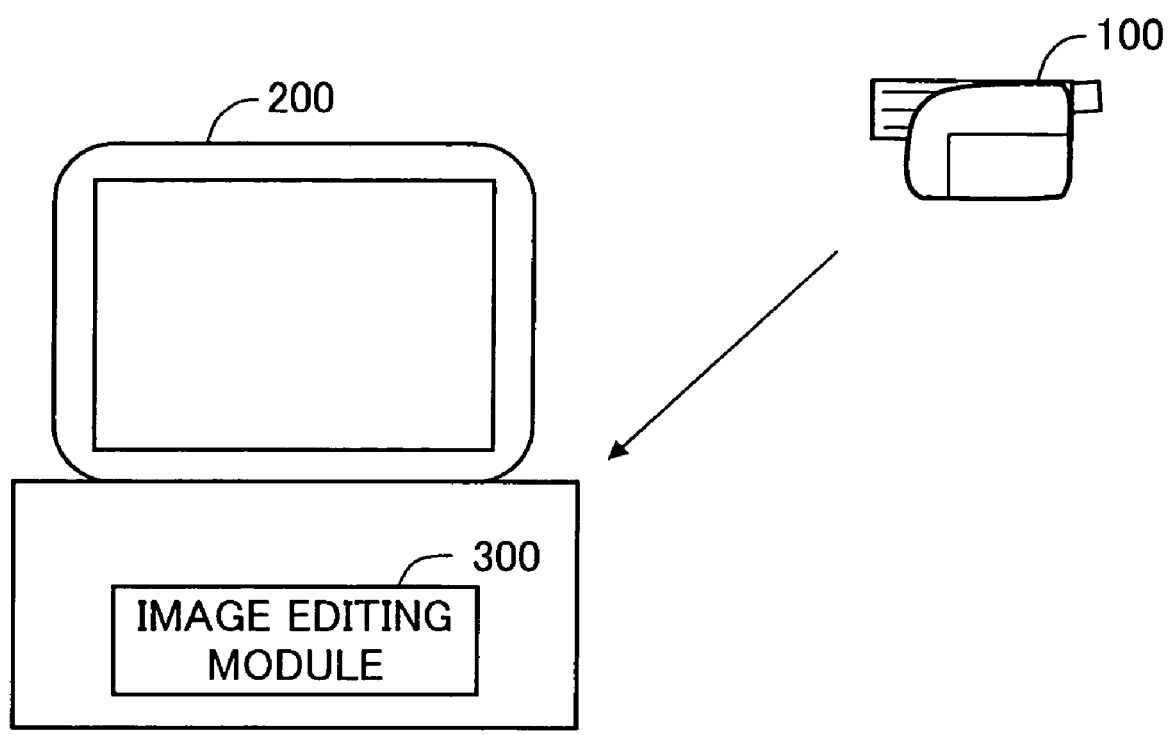
FIG. 1 is a schematic view illustrating an image processing system according to one embodiment of the present invention.

FIG. 1 is a schematic view illustrating an image processing system according to one embodiment of the present invention. This image processing system comprises a digital video camera 100 and a computer 200. The computer 200 comprises an image editing module 300 for executing video editing processing. The image editing module 300 allows various editing processing to be performed on a video filmed by the video camera 100. In this embodiment, processing for creating a video digest is performed, as described hereinafter.

Figure 2:
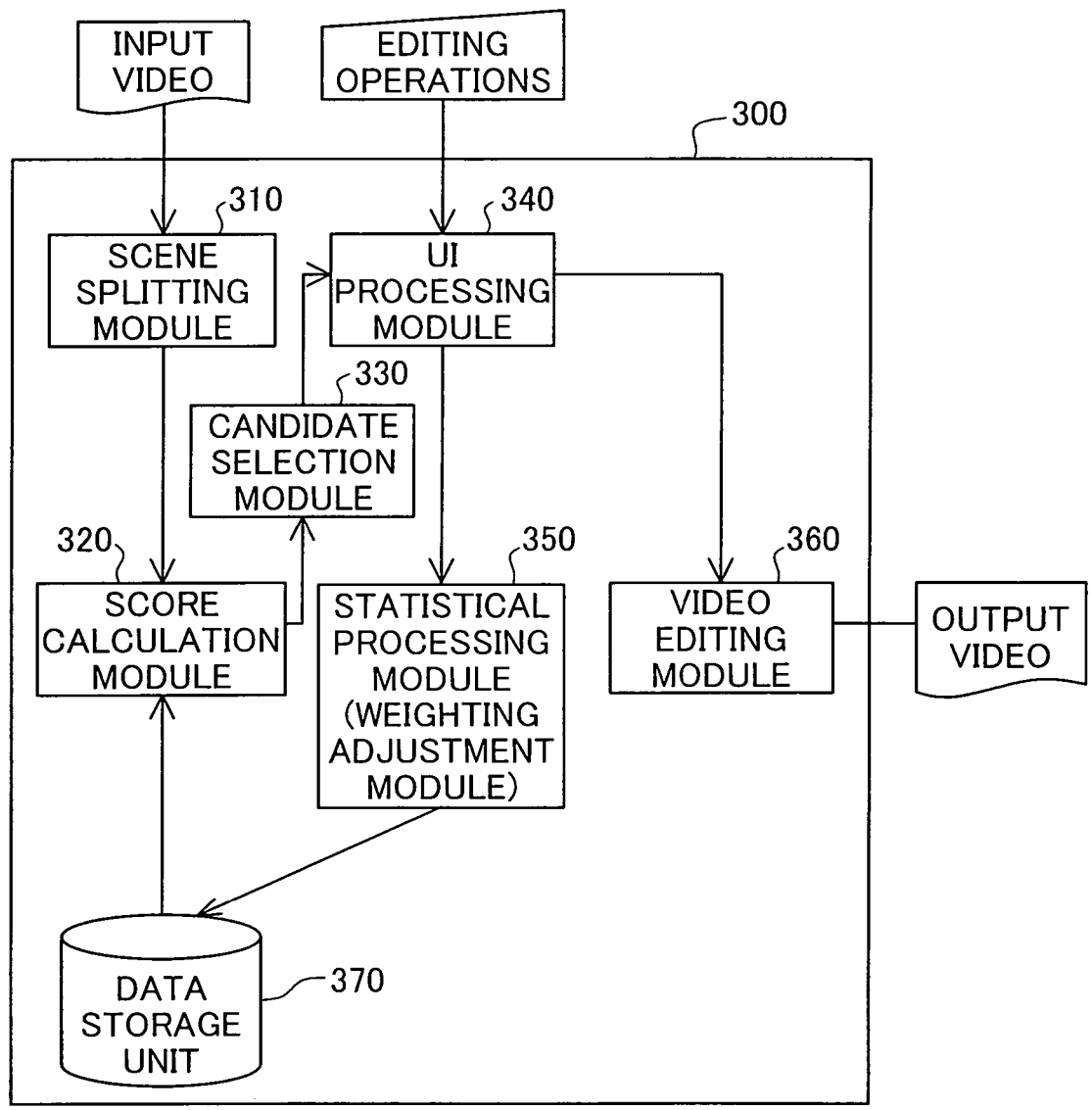
FIG. 2 is a block diagram illustrating the internal structure of an image editing module.

FIG. 2 is a block diagram illustrating the internal structure of the image editing module 300. The image editing module 300 comprises a scene splitting module 310, a score calculation module 320; a candidate selection module 330, a (UI) user interface processing module 340, a statistical processing module (weighting adjustment module) 350, a video editing module 360, and a data storage unit 370. The functions of these modules are described hereinafter. The functions of all of the modules from the scene splitting module 310 to the video editing module 360 are realized by executing one or more computer programs on the computer 200, by way of a CPU (processor) and a memory, which are not shown in the figures.

Figure 3:
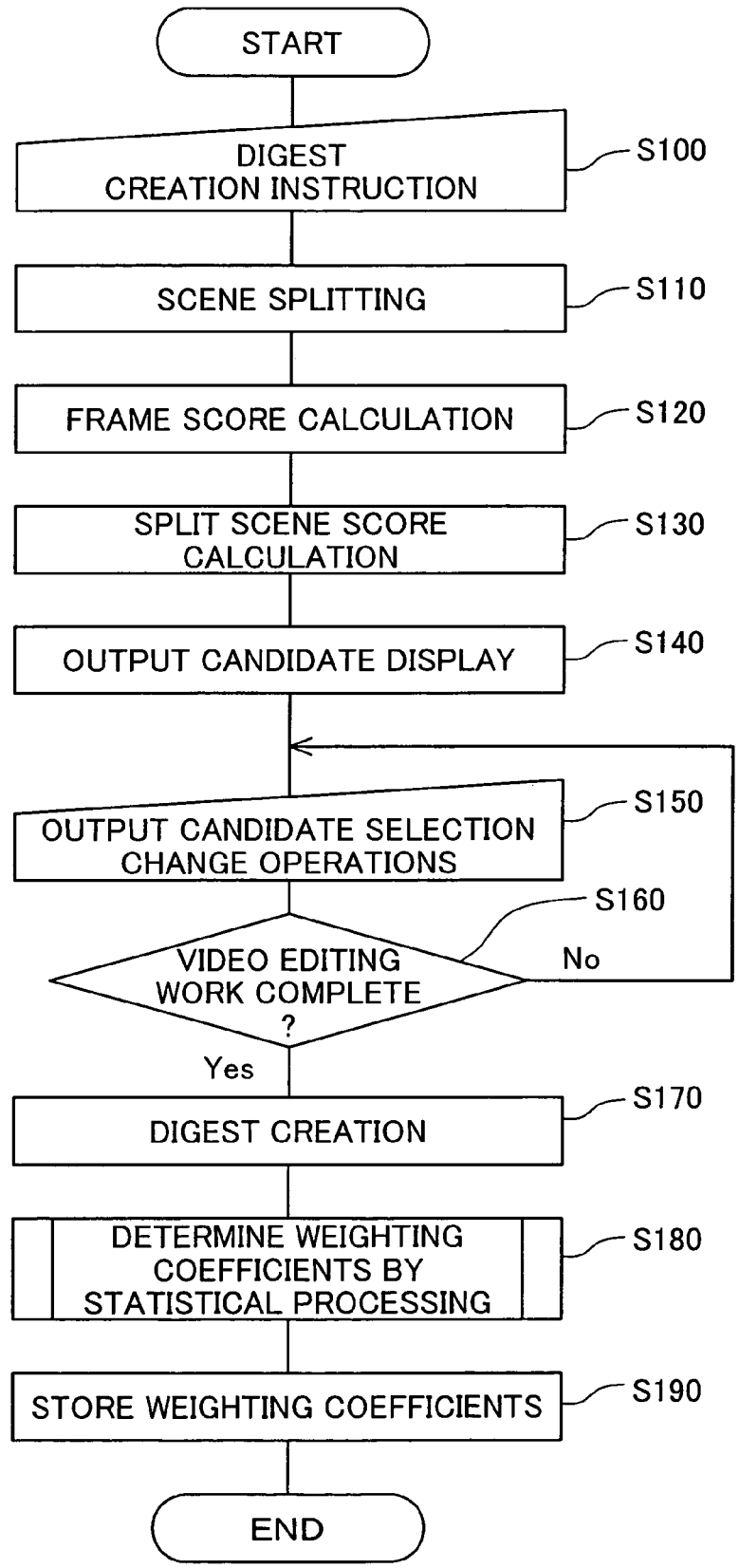
FIG. 3 is a flowchart illustrating the processing procedure in this embodiment.

FIG. 3 is a flowchart illustrating the processing procedure in this embodiment. In step S100, a user selects a video for processing (input video) and instructs that a digest is to be created therefrom. In step S110, the scene splitting module 310 divides this video into a plurality of split scenes. Herein, the term "split scene" means a continuous period within a video, and is hereinafter also referred to as a "scene section" or simply as a "scene." Note that a video consists of a plurality of frame images, and one split scene also includes a plurality of frame images. Hereinafter, frame images are also referred to simply as "frames."

Scene splitting can be achieved by various methods including, for example, splitting scenes according to chronological length. Alternatively, places in which there are large changes in index values for predetermined items (brightness or color histograms, differences in brightness or color between frames, sound and the like) can be used as scene splitting boundaries.

In step S120 the score calculation module 320 calculates a score or an evaluation value for each frame in the video. FIG. 4 shows an example of evaluation items for which scores are calculated, as well as weighting coefficients. While, as in the example shown in FIG. 4, a multiplicity of evaluation items can be used, in order to facilitate description, in this embodiment an example is described that uses only the three evaluation items shown in FIG. 5 (color variance, edge strength and brightness variance). Scores for these three evaluation items can, for example, be calculated in the following manner.

(1) Calculating a Frame Score for Color Variance EF1:

This frame score for color variance EF1 is defined so as to increase with increases in the statistical color variance within the frame. When this score EF1 is calculated, a histogram is first created for each color component related to hue, for all of the pixels in each frame image. For example, if the frame image is represented by an RGB color system, histograms are created for the three components, red, green and blue. If the frame image is represented by a YCrCb color system, histograms are calculated for the color difference components Cr and Cb. The statistical distribution of each color component is then calculated from these histograms. The frame score for color variance EF1 is defined so as to increase with increases in this statistical color variance. FIG. 6A shows one example of the relationship between this score EF1 and color variance. In this example, the score EF1 rises linearly from 0 until the color component variance reaches a predetermined value V1 and is kept to a predetermined maximum value EF1max if the color variance is greater than this value V1. The reason for establishing a maximum value EF1max is to prevent the frame score for color variance EF1 from becoming excessively large in comparison with other scores. It is, however, also possible to work without providing a maximum value EF1max. FIG. 6B shows another example of the relationship between color variance and the score EF1. In this example, the score EF1 is kept to zero until the color variance reaches a predetermined value V0, but the score EF1 increases linearly from zero to EF1max between a color variance of V0 and V1. By defining the score for color variance EF1 so that it increases with increases in color variance within the frame image, as shown in the examples in FIGS. 6A and 6B, it is possible to obtain a score that objectively represents the color variance within the frame image.

(2) Calculating a Frame Score for Edge Strength EF2:

The frame score for edge strength EF2 is defined so as to increase with increases in the number of strong edges in the frame image. When this score EF2 is calculated, edge strength is first calculated for all of the pixels in each frame. The absolute values of the results obtained by applying a Laplacian filter to the brightness values for each pixel can, for example, be used for the edge strength. If the frame image is represented by an RGB color system, edge strength may be calculated using the green component. If the frame image is represented by a YCrCb color system, edge strength is calculated using the brightness component Y. Next, an edge strength point, which increases with increases in the edge strength of each pixel, is calculated for each pixel. For example, the edge strength itself can be used as the edge strength point, or the edge strength point may be calculated as a function of the edge strength. Next, the total edge strength point value within the frame image is calculated according to the following formula (1).

$$\text{Total edge strength point value} = \sum_{(x,y)=(0,0)}^{(m,n)} (E(x,y) \cdot C(E(x,y))) \quad (1)$$

In this formula, an edge strength point $E(x,y)$ is the absolute value of the result of applying a Laplacian filter to the pixel value for a pixel position $(x,y)$ in the frame image. The function C is a weighting function determined according to the edge strength $E(x,y)$ at the position $(x,y)$. It is preferable to define this function C so as to increase with increases in the edge strength. The function C can, for example, be calculated using a linearly increasing function or a logarithmic function. Alternatively, C may be constant at C=1. Then, a frame score for edge strength EF2 is calculated according to the total edge strength point value. FIG. 6C shows one example of the relationship between the total edge strength point value and the score EF2. In this example, EF2 is kept to zero until the total edge strength point value reaches a predetermined value G0, but EF2 increases linearly from zero to EF2max, between a total edge strength point value of G0 and G1. However, a graph similar to that shown in FIG. 6A can also be used. By defining the score for edge strength EF2 so that it increases with increases in the total edge strength value within the frame image in this manner, it is possible to obtain a score that objectively represents the edge strength within the frame image.

(3) Calculating a Frame Score for Brightness Variance EF3:

The frame score for brightness variance is defined so as to increase with increases in the presence of various levels of brightness, ranging from bright pixels to dark pixels. In this embodiment, the brightness Y in a YCbCr color system may be used to calculate the score EF3. First, a brightness histogram is created for all of the pixels in each frame image. Then, the statistical variance is calculated for the brightness Y, from this histogram. This variance is referred to as the "brightness variance" or the "luminosity variance." The frame score for brightness EF3 is defined so as to increase with increases in the brightness variance. The relationship between brightness variance and the score EF3 can be defined in the same way as the relationship between the color variance and the score EF1 (for example, as in FIGS. 6A and 6B).

Note that, when calculating the histograms and edge strengths as described above, instead of using all of the pixels in each frame image, it is possible to use only a plurality of pixels selected at a predetermined sampling interval. Furthermore, when creating the histograms, values may be divided into a plurality of ranges, with pixels grouped into these ranges, and the frequency being found for each group. For example, if the red color component can have a value of 0 to 255, this range can be divided into 16 groups of 0-15, 16-31, 32-47 and so on until 240-255, and the total number of pixels belonging to each group can be found. Here, groups having fewer than a threshold number of pixels can be removed from the population when calculating the variance.

In step S120, the combined frame score $EF_{sum}(i)$ for each frame image is calculated according to the following formula (2).

Combined frame score for frame number i: EFsum(i)

$$EFsum(i) = \sum_{n=1}^{p} (k_n \cdot EF_n) \quad (2)$$

Here, $EF_n$ is the score for the $n^{th}$ evaluation item, $k_n$ is a weighting coefficient for the $n^{th}$ evaluation item, and p is the number of evaluation items.

As shown in FIG. 5, the initial value (value before adjustment) of the weighting coefficient $k_n$ for each evaluation item is set to 1.0. As described below, the value of each weighting coefficient $k_n$ is adjusted in response to selection operations performed by the user. In step S120, it is assumed that the values for the weighting coefficients k1 to k3 before adjustment are used.

Thus, once the combined score $EF_{sum}$ for each frame image has been calculated, in step S130 in FIG. 3, the score calculation module 320 calculates the combined score ES(m) for each split scene according to the following formula (3).

Combined Split Scene Score for Split Scene Number m: ES(m)

$$ES(m) = \frac{\sum_{i=1}^{N} EFsum(i)}{N} \qquad (3)$$

$$= \frac{\sum_{i=1}^{N} \left\{ \sum_{n=1}^{P} (k_n \cdot EF_n) \right\}}{N}$$

Here, N is the number of frames included in split scene number m. The combined split scene score ES is the average of the combined score $EF_{sum}$ for each frame image contained in the split scene.

Figures 7A, 7B:
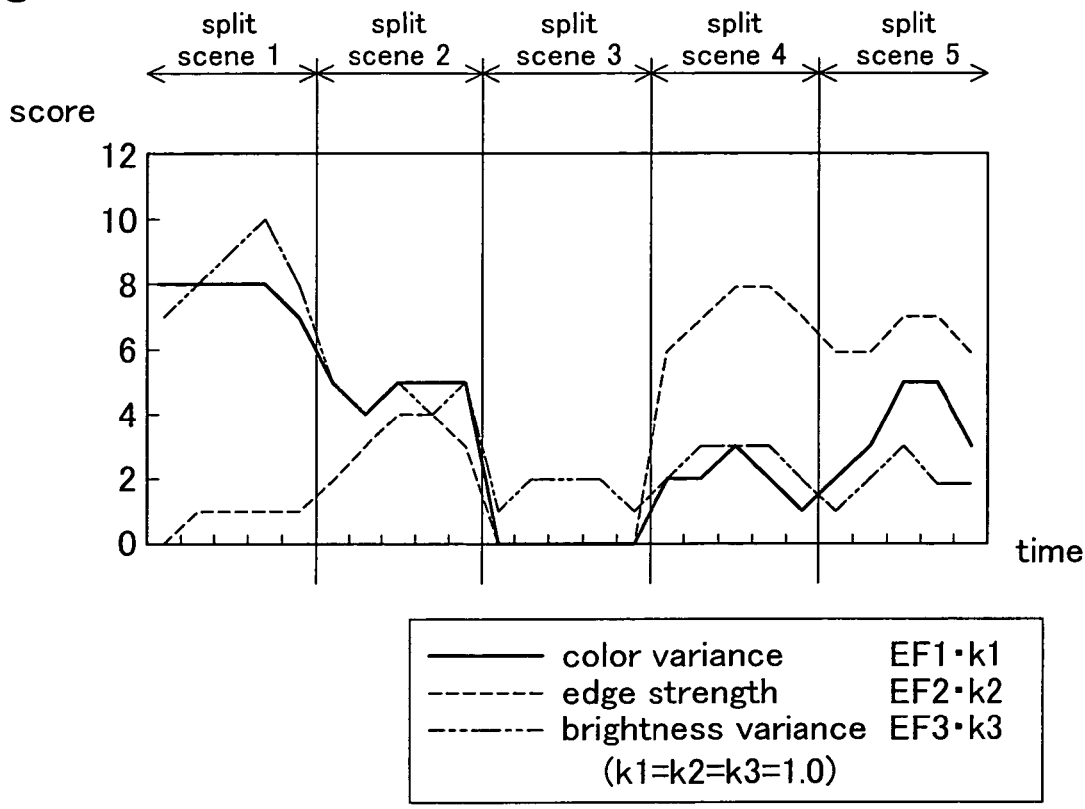
FIGS. 7A and 7B schematically illustrate an example of split scene divisions and combined split scene scores.

FIGS. 7A and 7B show examples of split scene divisions and combined split scene scores ES. In this example, the video is divided into five split scenes. FIG. 7A shows variations in the frame scores for the aforementioned three evaluation items. Note that the values used are obtained by multiplying each of the frame scores EF1 to EF3 by the weighting coefficients k1 to k3. Accordingly, the combined split scene score ES corresponds to the value arrived at by summing the values shown in FIG. 7A (EF1·k1, EF2·k2, EF3·k3) in each split scene, and dividing that cumulative value by the number of frame images N. As shown in FIG. 7B, split scene 1 has the highest combined split scene score ES, while split scene 3 has the lowest combined split scene score ES.

In step S140 in FIG. 3, the candidate selection module 330 determines the split scenes which are candidates for processing (also referred to as the "output candidates") based on the combined split scene scores ES, and the user interface processing module 340 displays the result on a display.

Figure 8:
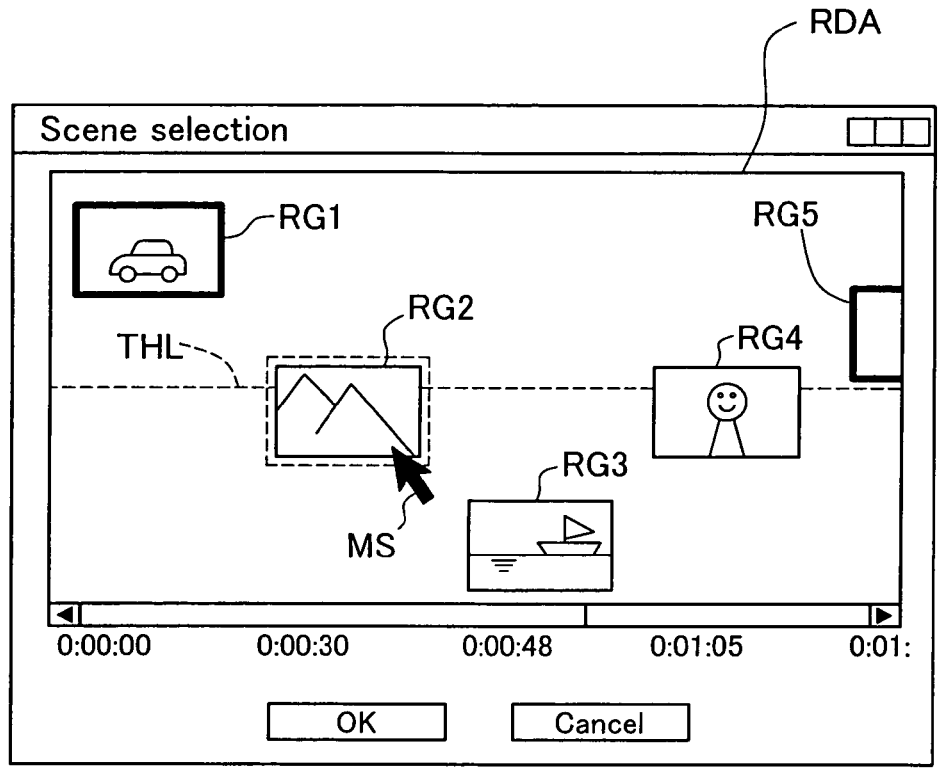
FIG. 8 is a schematic diagram illustrating one example of a scene selection window.

FIG. 8 shows one example of a scene selection window. This window has a representative image display area RDA, for displaying representative images RG1 to RG5 for a plurality of split scenes. The representative images RG1 to RG5 can, for example, be thumbnail images of the frame image that has the highest frame score in each split scene. Alternatively, these representative images can be thumbnail images of the frame image in a predetermined position (the beginning or the middle) of each split scene. The horizontal axis of the representative image display area RDA indicates time. In this example, the horizontal positions of the representative images are determined according to the timestamps on the frame images of the representative images RG1 to RG5. However, the representative images of the split scenes may be disposed at uniform intervals with corresponding time indicators. The vertical axis of the representative image display area RDA indicates the combined split scene score ES. In other words, the vertical positions of the representative images RG1 to RG5 are determined according to the combined split scene scores ES thereof shown in FIG. 7B.

Note that, if a user selects a representative image by clicking on it using a mouse controlled cursor MS, the selected representative image will be differentiated from the other representative images by surrounding it with a dotted line.

Furthermore, if the user double-clicks on one of the representative images, the corresponding split scene is played back in a separate window. This playback function can be used to check the content of the split scenes before beginning digest creation processing.

A threshold indicator line THL is visibly displayed near the center of the representative image display area RDA. This threshold indicator line THL indicates a predetermined threshold value for the combined split scene score ES. If the lower edge of a representative image, indicating its score ES, is above this threshold indicator line THL, that representative image is surrounded by a bold line, indicating that the representative image is an output candidate (digest candidate). The split scene represented by that representative image is to be used for the video digest. For example, as shown in FIG. 8, the first and the fifth split scenes are to be used for the digest. In other words, in this representative image display area RDA, two representative images RG1 and RG5 indicate split scenes that are candidates for constituting the digest. Alternatively, it is possible that all of the representative images RG1 to RG5 indicate candidates and the scores of the candidates are indicated by the positions thereof The user can change the split scenes that will constitute the digest by changing the vertical positions of the representative images.

Note that it is also possible to use the average of the combined split scene scores ES for all of the split scenes 1 to 5 as the threshold value to which the threshold indicator line THL corresponds. Alternatively, in cases where the user can specify the condensed video length (digest length), the threshold value may be set so that the digest length is close to this specified length. Specifically, in a case where, for example, one split scene is 30 seconds, and the digest time is one minute, the threshold value can be set so that only the representative images corresponding to the two split scenes having the highest combined split scene score ES are positioned above the threshold indicator line THL.

Figure 9:
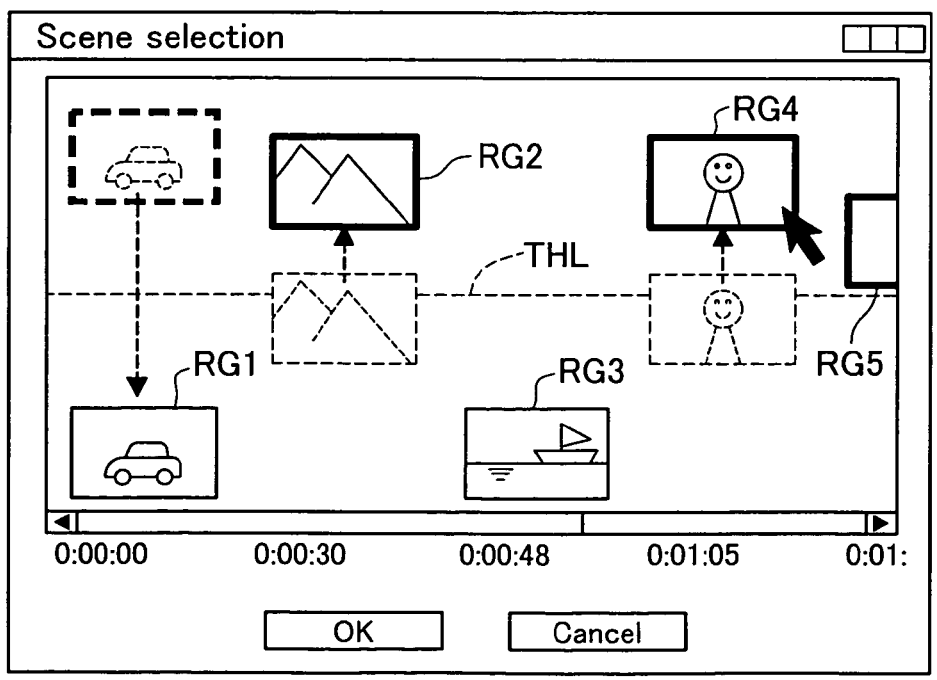
FIG. 9 is a schematic view illustrating one example of user selection operations.

In steps S150 and S160 in FIG. 3, the user changes the split scenes that will constitute the digest (which is to say, the output candidates) by changing the vertical positions of the representative images. FIG. 9 illustrates one example of this operation. In the figure, the representative image RG1 representing the first split scene is moved to a position below the threshold indicator line THL, and the representative images RG2 and RG4 representing the second and fourth split scenes are moved to positions above the threshold indicator line THL. Consequently, the second, fourth and fifth split scenes are selected as constituent elements of the digest.

Figure 10A:
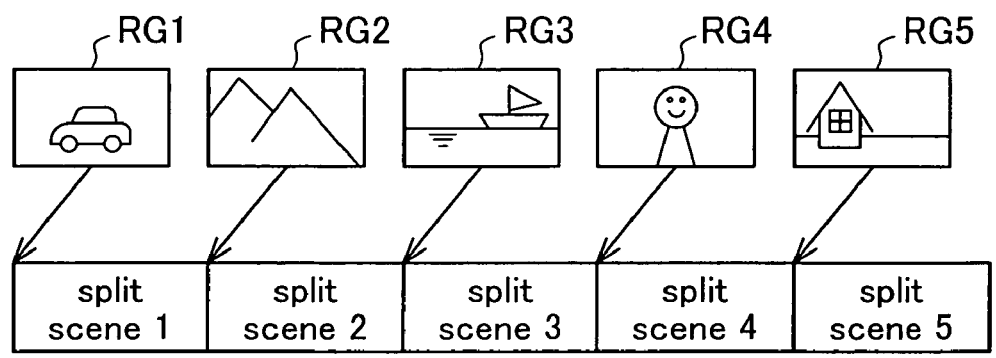
FIGS. 10A and 10B schematically illustrate the relationship between an entire video and a digest.
Figure 10B:
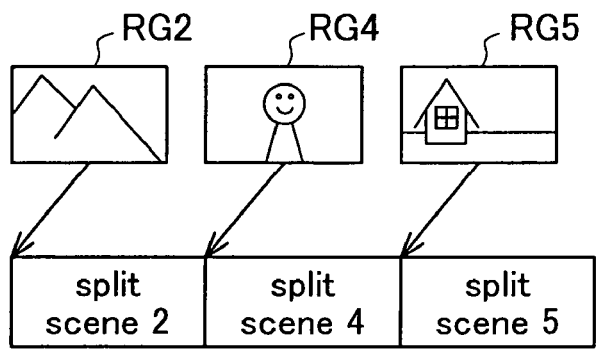

When user selection operations are complete, the digest is created by the video editing module 360. FIG. 10A illustrates the entire video, and FIG. 10B illustrates the digest. Here, the digest comprises the three split scenes 2, 4 and 5 that are selected in FIG. 9. Note that, when the digest is created, some of the frame images contained in the split scenes may be deleted so that the length of the overall digest is condensed.

In step S180 in FIG. 3, the statistical processing module 350 adjusts the weighting coefficient of each of the evaluation items using the results of the selection operations performed by the user in steps S150 and S160. In this step, each of the weighting coefficients for a plurality of evaluation items is adjusted so as to result in a relative increase in the weighting coefficients for evaluation items having a high degree of correlation with split scenes that have been selected for processing.

Figure 11:
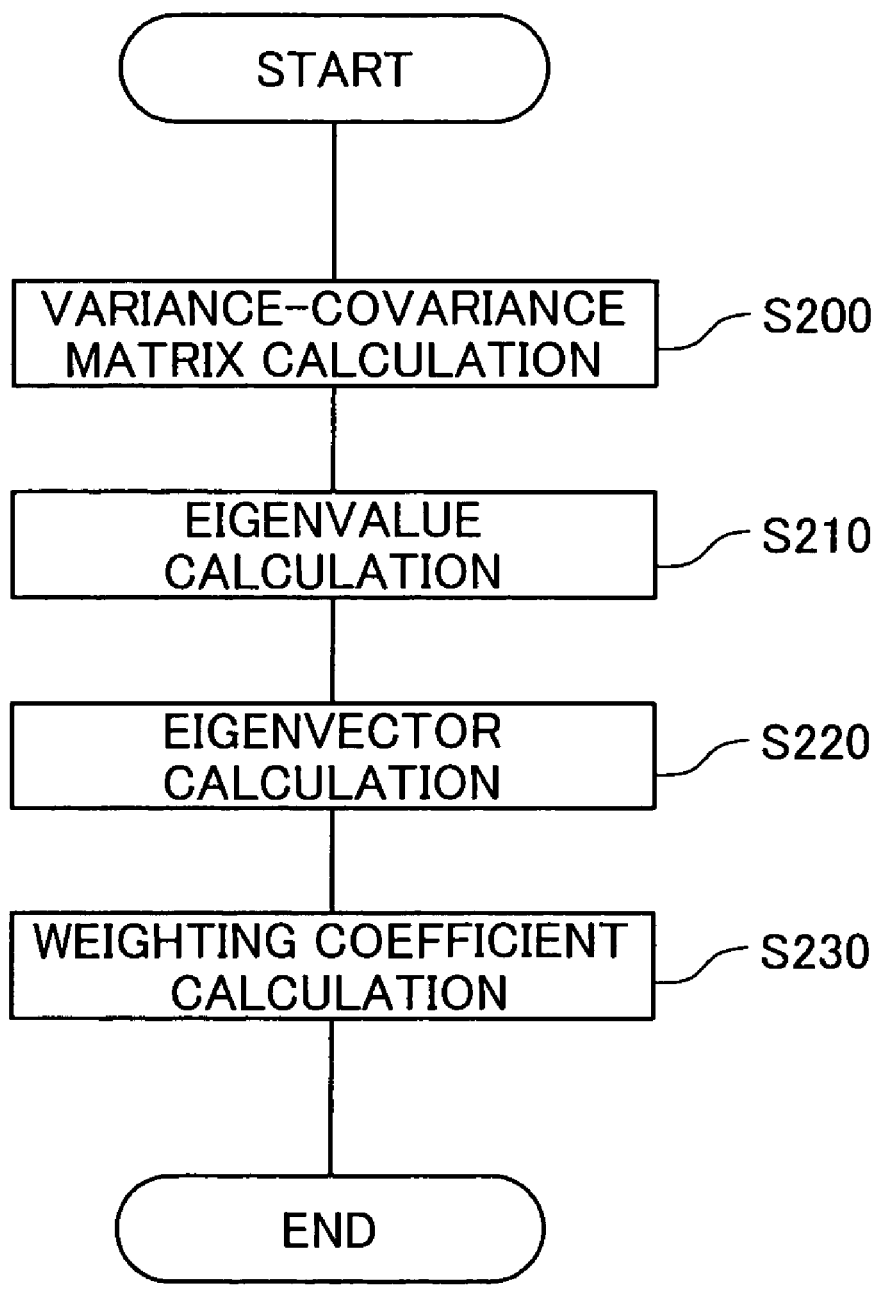
FIG. 11 is a flowchart indicating the detailed steps within step S180.

FIG. 11 is a flowchart showing the detailed steps within step S180. Here, principal component analysis, which is a type of statistical processing, is performed to determine which of the evaluation items is most closely related to the selected split scenes 2, 4 and 5. First in step S200, the variance-covariance matrix shown below in formula (4) is created from the frame scores EF1, EF2 and EF3 for a multiplicity of frame images contained in the split scenes 2, 4 and 5.

$$\begin{pmatrix} s_{11} & s_{12} & s_{13} \\ s_{21} & s_{22} & s_{23} \\ s_{31} & s_{32} & s_{33} \end{pmatrix} \cdot \begin{pmatrix} a_1 \\ a_2 \\ a_3 \end{pmatrix} = \lambda \cdot \begin{pmatrix} a_1 \\ a_2 \\ a_3 \end{pmatrix} \quad (4)$$

The symbols used in the formula have the following meanings:

S11: variance of frame score EF1

S22: variance of frame score EF2

S33: variance of frame score EF3

S12, S21: covariance of frame scores EF1 and EF2

S13, S31: covariance of frame scores EF1 and EF3

S23, S32: covariance of frame scores EF2 and EF3

$a_1$, $a_2$, $a_3$: eigenvector components $\lambda$: eigenvalue

In step S210, the eigenvalue $\lambda$ is found by solving the foregoing formula (4). Formula (4) is a trivariate formula, and therefore three eigenvalues $\lambda$ are produced. The following formula (5) is the variance-covariance formula obtained using the example shown in FIG. 7A and the eigenvalues $\lambda$ produced by solving the same.

$$\begin{pmatrix} 1.316 & -1.55 & 1.169 \\ -1.55 & 2.987 & -1.64 \\ 1.169 & -1.64 & 1.236 \end{pmatrix} \cdot \begin{pmatrix} a_1 \\ a_2 \\ a_3 \end{pmatrix} = \lambda \cdot \begin{pmatrix} a_1 \\ a_2 \\ a_3 \end{pmatrix} \quad (5)$$

$\lambda_1 = 4.985$ $\lambda_2 = 0.461$ $\lambda_3 = 0.091$

The eigenvalue having the highest value $\lambda_1$ is the eigenvalue corresponding to the so-called first principal component.

In step S220 the eigenvector (a1, a2, a3) for the first principal component is calculated. The eigenvector (a1, a2, a3) is obtained by solving the following formula (6).

$$a_1^2 + a_2^2 + a_3^2 = 1 \quad (6a)$$

$$s_{11} \cdot a_1 + s_{12} \cdot a_2 + s_{13} \cdot a_3 = \lambda \cdot a_1 \quad (6b)$$

$$s_{21} \cdot a_1 + s_{22} \cdot a_2 + s_{23} \cdot a_3 = \lambda \cdot a_2 \quad (6c)$$

$$s_{31} \cdot a_1 + s_{32} \cdot a_2 + s_{33} \cdot a_3 = \lambda \cdot a_3 \quad (6d)$$

If the values from formula (5) above are substituted into formula (6) and this is solved, the following values are produced as components of the eigenvector ($a_1$, $a_2$, $a_3$).

$a_1 = -0.466$ $a_2 = +0.748$ $a_3 = -0.472$

The three components of this eigenvector, $a_1$, $a_2$ and $a_3$, correspond to the three evaluation items. Furthermore, these components $a_1$, $a_2$ and $a_3$ express the extent to which each evaluation item influences user selection operations. In the example described above, the eigenvector component $a_2$, corresponding to the second evaluation item (edge strength) is the largest, and therefore it can be understood that the frame score EF2 for this evaluation item had the greatest influence on user selection operations. Furthermore, the influence of the first and third evaluation items (color variance and brightness variance) is small. In other words, the eigenvector components $a_1$, $a_2$ and $a_3$ have meaning as index values for indicating the relative influence of each of the evaluation items on user selection operations. Furthermore, these components $a_1$, $a_2$ and $a_3$ can be considered as index values for indicating the degree of correlation with user selection operations.

In step S230, the weighting coefficient for each of the evaluation items is adjusted based on the eigenvector ($a_1$, $a_2$, $a_3$) obtained in this manner. In other words, the weightings for evaluation items corresponding to components having greater values, from among the eigenvector components $a_1$, $a_2$ and $a_3$, are correspondingly increased, while the weightings for evaluation items corresponding to components having smaller values are correspondingly decreased. Such weighting adjustment can, for example, be performed according to the following formula (7).

$$k_n = \left( \frac{a_n - \text{Min}(a)}{\text{Max}(a) - \text{Min}(a)} \right) \cdot (1 - b) + b \quad (7)$$

In the formula, Min(a) and Max(a) are the minimum and maximum values for the eigenvector components $a_1$ to $a_3$, and b is a predetermined positive constant.

In formula (7), the difference between the $n^{th}$ eigenvector component an, corresponding to the weighting coefficient kn for the $n^{th}$ evaluation item and the minimum value Min(a) is normalized by the difference between the maximum value Max(a) and the minimum value Min(a). The constant b serves to ensure that the weighting coefficient kn is not zero after adjustment. Note that the constant b can, for example, be set to a value of less than 1. If the constant b is set to 0.1, the weighting coefficients k1 to k3 corresponding to the three evaluation items can be obtained in the manner of the following formulas (8a) to (8c).

$$k_1 = \left( \frac{-0.466 - (-0.472)}{0.748 - (-0.472)} \right) \cdot (1 - 0.1) + 0.1 = 0.104 \quad (8a)$$

$$k_2 = \left( \frac{0.748 - (-0.472)}{0.748 - (-0.472)} \right) \cdot (1 - 0.1) + 0.1 = 1.0 \quad (8b)$$

$$k_3 = \left( \frac{-0.472 - (-0.472)}{0.748 - (-0.472)} \right) \cdot (1 - 0.1) + 0.1 = 0.1 \quad (8c)$$

As can be understood from these results, in the adjustment according to formula (7) above, the weighting coefficient of the evaluation item corresponding to the maximum value Max(a) for the eigenvector component is maintained at the same value, and the weighting coefficients for evaluation items corresponding to other eigenvector components are set to lower values. Consequently, it can be understood that the weighting for evaluation items having a high degree of correlation to user selection operations relatively increases. As can also be understood from this example, in the present specification, the expression "increase the weighting" does not necessarily mean a literal increase of the weighting coefficient, but refers to a relative increase as compared to other weighting coefficients.

Note that the weighting adjustment can be performed using various formulas other than formula (7). For example, a formula may be used which increases the weighting coefficient for an evaluation item corresponding to a maximum value Max(a) eigenvector component, and decreases the weighting coefficients for evaluation items corresponding to other eigenvector components. Specifically, for example, if normalized so that the average value of the weighting coefficients k1 to k3 obtained with formulas (8a) to (8c) above is 1.0, the corrected coefficients are k1=0.26, k2=2.49 and k3=0.25. These modified coefficients may be used instead. However, in this embodiment the weighting coefficients k1 to k3 obtained with formulas (8a) to (8c) above are used without modification.

Once weighting coefficients have been adjusted in this manner, the statistical processing module 350 stores the adjusted weighting coefficients in the data storage unit 370, at step S190 in FIG. 3. These weighting coefficients are subsequently used when the user creates another video digest.

Figures 12A, 12B:
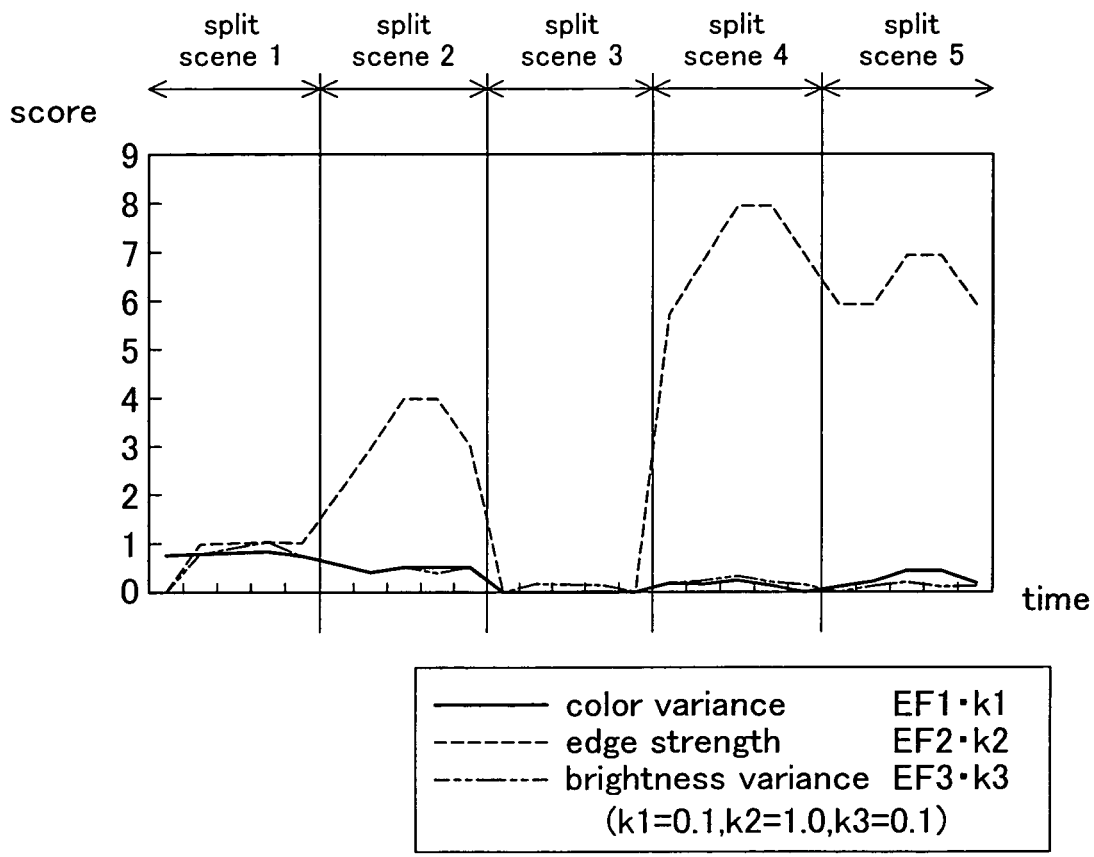
FIGS. 12A and 12B schematically illustrate an example of recalculation of scores using adjusted weightings.

FIGS. 12A and 12B show an example of recalculation of various scores shown in FIGS. 7A and 7B, using the adjusted weighting coefficients. It can be understood that, as shown in FIG. 12A, the value EF2·k2, which relates to edge strength, is relatively increased in scenes 2, 4 and 5, which were selected by the user. Furthermore, it will be understood that, if adjusted weighting coefficients are used, the combined split scene scores ES for split scenes 2, 4 and 5 are relatively increased, as shown in FIG. 12B. Consequently, in step S130 in FIG. 3, these three split scenes 2, 4 and 5 will be initially displayed as digest candidates. However, it should be noted that adjusted weighting coefficients are used only when the user subsequently performs digest creation processing, and FIGS. 12A and 12B is a hypothetical drawing assuming that digest creation processing were performed again for the same video as represented in FIGS. 7A and 7B. Thus, the adjusted weighting coefficients are used when subsequent digest creation processing is performed, and therefore, in steps S120 and S130, suitable candidates reflecting user preferences can be displayed. Consequently, it is possible to reduce user operations when images are chosen for processing.

B. Variants

B1. Variant 1

In the embodiment described above, processing is performed on a video supplied to a computer 200 from a digital video camera 100 and stored within this computer 200, but various sources may be used for the video that is processed. For example, the present invention may be applied to the creation of the digest from a video that is transmitted by way of broadcast.

Furthermore, the present invention may also be applied to situations in which a user issues a request of digest creation for a video distribution server. At this time, the video itself is stored on a server connected to the computer 200 by way of a network. Then the user performs selection operations on the computer 200, by way of a window such as that shown in FIG. 9, and a video digest is created on the server side and sent to the computer 200. In this case, some of the various modules shown in FIG. 2 (for example, the score calculation module 320, the statistical processing module 350 and the video editing module 360) may be provided on the server side.

B2. Variant 2

In the embodiment described above, a video is used as the object of image processing, but static images can also be used as the object of image processing. In this case, the present invention is applied to the selection of a plurality of static images from a greater number of static images for subsequent predetermined image processing (for example inclusion in an album or printing).

Note that it is possible that the user choose only one frame image or one still image to be processed. In this case, the weighting of an evaluation item having a high score in the single selected image can be adjusted so as to relatively increase this weighting. Furthermore, if a single image is selected in one operation, and this operation is repeated several times, the scores for the evaluation items for a plurality of images selected in these operations can be used in a principal component analysis similar to that described in the foregoing embodiment, thus allowing the weightings of a plurality of evaluation items to be adjusted.

Note that, both in cases wherein a single image is selected in one operation, and in cases where a plurality of images are selected in one operation, the scores for the evaluation items in the most recently selected M number of images (M being a predetermined integer, no less than 2) may be used to adjust the weightings of a plurality of evaluation items. By these means, it is possible to provide subsequent image selection support, which is always suited to the most recent user selection operations.

B3. Variant 3

In the embodiment described above, the degree of correlation between user selection operations and evaluation items is found using principal component analysis, but the degree of correlation can be found using other methods. For example, it is possible to set the degree of correlation for the evaluation item that has the highest score in the user selected image to a predetermined high value (for example, 1) and set the degree of correlation for other evaluation items to a predetermined low value (for example, 0.5).

Furthermore, in the embodiment described above, the weightings of all of the evaluation items are adjusted, but it suffices to increase at least the weighting of the evaluation item having the highest degree of correlation with user selection operations, and it is not necessary to readjust the weightings of the other evaluation items. However, adjustment is preferably made by increasing the weighting of the evaluation item having the highest degree of correlation and decreasing the weighting of the evaluation item having the lowest degree of correlation.

Alternatively, adjustment may be made by leaving the weighting of evaluation items within a predetermined intermediate range of degree of correlation unadjusted, and increasing the weighting of evaluation items having a degree of correlation superior to this range, while decreasing the weighting of evaluation items having a degree of correlation inferior to this range.

B4. Variant 4

In the embodiment described above, some of the structures implemented by way of hardware may be replaced by software, and likewise some of the structures implemented by way of software may be replaced by hardware. For example, it is possible that some of the functions of the image editing module 300 (FIG. 2) be performed by hardware circuits.

The present invention has been described in detail and illustrated in the drawings, but these represent only one example, and the invention is not limited thereto. The spirit and the scope of the invention is, therefore, to be determined solely by the appended claims.

What is claimed is:

1. A digest creation apparatus for creating a digest video comprising:

a display device;

a memory configured to store an image group, the image group being a group of frame images constituting a video;

a candidate image selection module configured to select a plurality of candidate images from the image group as image processing candidates for undergoing predetermined processing, the plurality of candidate images being representative images for representing scene sections when the video is divided into a plurality of scene sections;

a user interface module configured to display the plurality of candidate images on the display device and to identify one or more images that are selected by a user selection from amongst the plurality of candidate images for image processing; and a digest video creation module configured to perform, as the predetermined processing, processing for creating a digest video, principally comprising one or more scene sections corresponding to the one or more representative images that are selected as the images to undergo image processing;

the candidate image selection module including:

a score calculation module configured to calculate scores for a plurality of preselected evaluation items with respect to each of individual images in the image group, and to produce a combined score for each of the individual images by weighting and combining a plurality of the scores of the individual images using respective weighting coefficients, wherein the scores for the evaluation items with respect to each of the representative images are scores representing the entirety of the scene section to which the representative image corresponds;

a selection execution module configured to select the plurality of candidate images from the image group based on the combined score; and a weighting adjustment module configured to calculate a degree of correlation between the user selection and each of the plurality of evaluation items, wherein the calculation of the degree of correlation is made as a function of the scores for the plurality of evaluation items calculated for the one or more candidate images that are selected by the user selection for image processing, and to increase the respective weighting coefficients for the evaluation items that are calculated to have a high degree of correlation with the user selection.

2. The digest creation apparatus recited in claim 1, wherein the weighting adjustment module increases the weighting coefficient for the evaluation item for which the degree of correlation is the highest and decreases the weighting coefficient for the evaluation item for which the degree of correlation is the lowest.

3. The digest creation apparatus recited in claim 1, wherein the weighting adjustment module finds a first principal component by performing principal component analysis for the scores of the plurality of evaluation items as applied to the plurality of images to be processed, and adjusts the weighting coefficients by using a component of an eigenvector corresponding to the first principal component as the degree of correlation.

4. The digest creation apparatus recited in claim 1, wherein the user interface module displays the plurality of candidate images at positions corresponding to the combined score of each candidate image.

5. A method for creating a digest video comprising:

providing a display device;

providing a memory configured to store an image group, the image group being a group of frame images constituting a video;

selecting a plurality of candidate images from the image group as image processing candidates for undergoing predetermined processing, the plurality of candidate images being representative images for representing scene sections when the video is divided into a plurality of scene sections;

displaying the plurality of candidate images on the display device and identifying one or more images that are selected by a user selection from amongst the plurality of candidate images for image processing; and performing, as the predetermined processing, processing for creating a digest video, principally comprising one or more scene sections corresponding to the one or more representative images that are selected as the images to undergo image processing;

the selecting of the plurality of candidate images comprising:

(i) calculating scores for a plurality of preselected evaluation items with respect to each of individual images in the image group, and producing a combined score for each of the individual images by weighting and combining a plurality of the scores of the individual images using respective weighting coefficients, wherein the scores for the evaluation items with respect to each of the representative images are scores representing the entirety of the scene section to which the representative image corresponds; and (ii) selecting the plurality of candidate images from the image group based on the combined score;

the method further comprising:

calculating a degree of correlation between the user selection and each of the plurality of evaluation items as a function of the scores for the plurality of evaluation items calculated for the one or more candidate images that are selected by the user selection for image processing, and increasing the respective weighting coefficients for evaluation items that are calculated to have a high degree of correlation with the user selection, wherein each of the operations of the method for creating the digest video is executed by an integrated circuit.

6. The method for creating a digest video recited in claim 5, wherein the calculating of the degree of correlation includes increasing the weighting coefficient for the evaluation item for which the degree of correlation is the highest and decreasing the weighting coefficient for the evaluation item for which the degree of correlation is the lowest.

7. The method for creating a digest video recited in claim 5, wherein the calculating of the degree of correlation includes finding a first principal component by performing principal component analysis for the scores of the plurality of evaluation items as applied to the plurality of images to be processed, and adjusting the weighting coefficients by using a component of an eigenvector corresponding to the first principal component as the degree of correlation.

8. The method for creating a digest video recited in claim 5, wherein
the displaying of the plurality of candidate images includes displaying the plurality of candidate images at positions corresponding to the combined score of each candidate image.

9. A computer program stored on a computer readable storage medium, comprising:
a first program for causing a computer to select a plurality of candidate images from a given image group as image processing candidates for undergoing predetermined processing, the given image group being a group of frame images constituting a video, and the plurality of candidate images being representative images for representing scene sections when the video is divided into a plurality of scene sections;
a second program for causing the computer to display the plurality of candidate images on a display device and to identify one or more images selected for processing by a user from amongst the plurality of candidate images; and
a third program for causing the computer to perform, as the predetermined processing, processing for creating a digest video, principally comprising one or more scene sections corresponding to the one or more representative images that are selected as the images to undergo image processing;
the first program including:
a program for causing the computer to calculate scores for a plurality of preselected evaluation items with respect to each of individual images in the image group, and to produce a combined score for each of the individual images by weighing and combining the plurality of scores using respective weighting coefficients, wherein the scores for the evaluation items with respect to each of the representative images are scores representing the entirety of the scene section to which the representative image corresponds;
a program for causing the computer to select the plurality of candidate images from the image group based on the combined score; and
a program for causing the computer to find a degree of correlation between the user selection and each of the plurality of evaluation items as a function of the scores for the plurality of evaluation items calculated for the one or more candidate image that are selected for image processing, and to increase the weighting coefficient for an evaluation item having a high degree of correlation with the user selection.

* * * * *